(12) United States Patent
Hofer et al.

(10) Patent No.: US 9,987,793 B2
(45) Date of Patent: Jun. 5, 2018

(54) METHOD FOR MANUFACTURING A PANELING MEMBER

(71) Applicant: MAGNA STEYR Fahrzeugtechnik AG & Co KG, Graz (AT)

(72) Inventors: Bernhard Hofer, Graz (AT); Wolfgang Passegger, Tillmitsch (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 0 days. days.

(21) Appl. No.: 15/200,822

(22) Filed: Jul. 1, 2016

(65) Prior Publication Data
US 2017/0001367 A1    Jan. 5, 2017

(30) Foreign Application Priority Data
Jul. 1, 2015   (EP) .................................... 15174774

(51) Int. Cl.
*B29C 65/48*   (2006.01)
*B32B 27/12*   (2006.01)
(Continued)

(52) U.S. Cl.
CPC ............ *B29C 65/48* (2013.01); *B29C 51/082* (2013.01); *B29C 51/266* (2013.01); *B29C 63/0073* (2013.01); *B29C 66/721* (2013.01); *B32B 1/00* (2013.01); *B32B 3/08* (2013.01); *B32B 5/02* (2013.01); *B32B 5/08* (2013.01); *B32B 5/12* (2013.01); *B32B 7/12* (2013.01); *B32B 27/08* (2013.01); *B32B 27/12* (2013.01); *B32B 27/308* (2013.01); *B32B 27/365* (2013.01); *B62D 29/043* (2013.01); *B29K 2055/02* (2013.01);
(Continued)

(58) Field of Classification Search
CPC ..... B29C 65/48; B29C 66/721; B29C 51/266; B29C 51/082; B32B 3/08; B32B 5/08; B32B 5/12; B32B 7/12; B32B 5/02; B32B 1/00; B32B 37/00; B32B 27/365; B32B 27/308; B32B 27/08; B32B 27/12
See application file for complete search history.

(56) References Cited

U.S. PATENT DOCUMENTS 8,073,298 B2 * 12/2011 Meidar ................... B29C 70/72
                                                              385/101
2009/0053960 A1   2/2009 Dovell et al.
(Continued)

FOREIGN PATENT DOCUMENTS

CN        101711208 A      5/2010
CN        101720293 A      6/2010
(Continued)

OTHER PUBLICATIONS

Office Action for Chinese Patent Application No. 201610471111X, dated Nov. 3, 2017, 10 pages including 5 pages of English translation.

*Primary Examiner* — Ryan J Walters
(74) *Attorney, Agent, or Firm* — Jordan IP Law, LLC; Todd A. Vaughn

(57) ABSTRACT

A method for producing a panelling component for a motor vehicle. The method includes press-forming a fiber-reinforced load-bearing composite component; forming a film having a class-A surface; and joining the load-bearing composite component as a first layer and the film as a second layer via an adhesive as an interposed third layer.

15 Claims, 5 Drawing Sheets

(51) Int. Cl.

| | |
|---|---|
| *B29C 51/08* | (2006.01) |
| *B29C 63/00* | (2006.01) |
| *B62D 29/04* | (2006.01) |
| *B29C 51/26* | (2006.01) |
| *B29C 65/00* | (2006.01) |
| *B32B 5/02* | (2006.01) |
| *B32B 5/08* | (2006.01) |
| *B32B 5/12* | (2006.01) |
| *B32B 7/12* | (2006.01) |
| *B32B 27/08* | (2006.01) |
| *B32B 27/30* | (2006.01) |
| *B32B 27/36* | (2006.01) |
| *B32B 1/00* | (2006.01) |
| *B32B 3/08* | (2006.01) |
| *B29K 105/12* | (2006.01) |
| *B29K 55/02* | (2006.01) |
| *B29K 69/00* | (2006.01) |
| *B29L 31/30* | (2006.01) |

(52) U.S. Cl.
CPC ...... *B29K 2069/00* (2013.01); *B29K 2105/12* (2013.01); *B29L 2031/3041* (2013.01); *B32B 2255/10* (2013.01); *B32B 2255/12* (2013.01); *B32B 2255/26* (2013.01); *B32B 2260/021* (2013.01); *B32B 2260/046* (2013.01); *B32B 2262/14* (2013.01); *B32B 2274/00* (2013.01); *B32B 2307/4023* (2013.01); *B32B 2307/414* (2013.01); *B32B 2307/558* (2013.01); *B32B 2307/738* (2013.01); *B32B 2307/75* (2013.01); *B32B 2605/08* (2013.01); *B32B 2607/00* (2013.01)

(56) References Cited

U.S. PATENT DOCUMENTS

2010/0078927 A1    4/2010  Takeuchi
2013/0230714 A1*   9/2013  Liran ................. B32B 37/1018
                                                    428/318.4

FOREIGN PATENT DOCUMENTS

| CN | 101927570 A | 12/2010 |
| CN | 103958202 A | 7/2014 |
| DE | 102009037430 A1 | 3/2011 |

\* cited by examiner

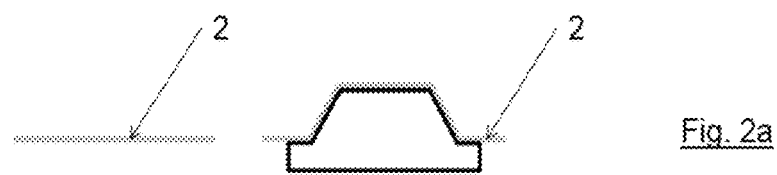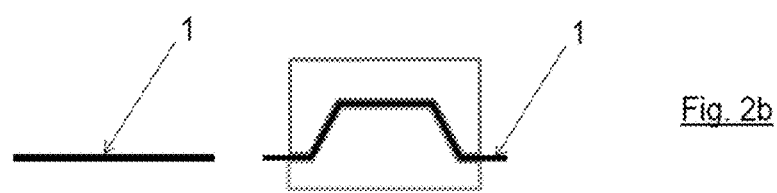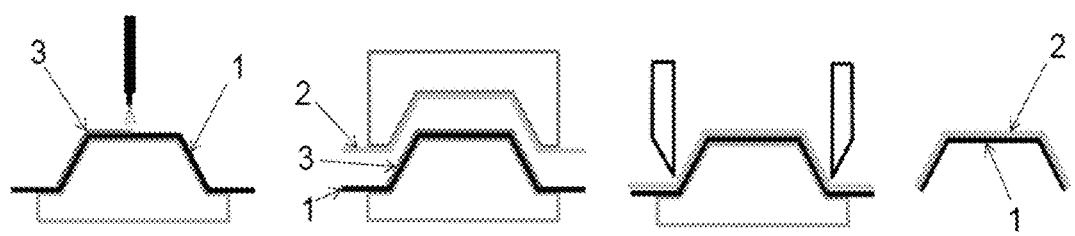
Fig. 2a
Fig. 2b
Fig. 2c

METHOD FOR MANUFACTURING A PANELING MEMBER

CROSS-REFERENCE TO RELATED APPLICATIONS

The present application claims priority 35 U.S.C. § 119 to European Patent Publication No. EP15174774.8 (filed on Jul. 1, 2015), which is hereby incorporated by reference in its complete entirety.

TECHNICAL FIELD

Embodiments relate to a method for producing a panelling component, and to a panelling component of this kind.

BACKGROUND

Panelling components are used in vehicle production, in particular as plastic panels for vehicles such as motor vehicles. Panelling components of this kind are generally produced by a method such as injection moulding, as a sheet moulding compound (SMC) or by thermoforming, wherein all the plastic is generally coloured all the way through or a coating is applied subsequently. Since plastics generally have a higher thermal expansion coefficient than aluminium components, fillers must be employed when using such plastic panels to reduce thermal expansion and, in addition, larger joints must be provided for tolerance compensation.

When using pressing techniques to produce the panelling components, which also allow the formation of smaller radii and hence good design capability, thermosetting plastics that are difficult to recycle must be employed. When producing a component from one or more plies that are pressed together, it is also not possible to form a class-A surface since mould surfaces generally leave an impression on the component. It is also not possible to produce a class-A surface on a component produced via a pressing tool by sticking on a surface film.

With some production methods, such as thermoforming, freedom of design is limited since relatively small radii may not be reproduced owing to the large wall thicknesses required. Components with thinner walls, on the other hand, are mechanically unstable. Moreover, colours have to be applied to the surfaces via expensive coating processes.

SUMMARY

Embodiments relate to a method for producing a panelling component which allows simple and low-cost production of a panelling component having a class-A surface.

In particular, good formability of the component in production is to be made possible. Expensive coating of the component should not be required, despite the desired class-A surface. The component should also be simple to recycle.

In accordance with embodiments, a method for producing a panelling component for a motor vehicle may comprise at least one of the following: press-forming a fibre-reinforced load-bearing composite component; forming a film having a class-A surface; and joining the load-bearing composite component as a first layer and the film as a second layer via an adhesive as an interposed third layer.

In accordance with embodiments, a load-bearing component is produced via pressing, on one hand, and a visible surface for the load-bearing component is formed separately, on the other hand, the visible surface already having a class-A surface. Since the visible surface is produced separately and is not produced simultaneously by pressing like a laminate, for example, it may be produced with a high surface finish even at this stage. Via the adhesive joint between the two formed layers, component tolerances, such as dimensional deviations and surface deviations between the load-bearing composite component and the pre-formed film, may be accommodated. During the production of the adhesive joint, the two components may be pressed together lightly.

In accordance with embodiments, the film may be formed via thermoforming, and thus, is preferably a thin, thermoformed film having a class-A surface. Thermoforming may take place in a single-sided mould a temperature range of between 175 to 190 degrees Celsius and under a vacuum formed in the mould.

In accordance with embodiments, he film may have already set and/or cooled down before joining, and/or already has the structure of the finished panelling component before joining.

In accordance with embodiments, the film may be composed of just a single ply, and not as a laminate. The film may be a co-extrudate. The film may be structurally configured to perform several functions.

In accordance with embodiments, the film may be connected to the load-bearing composite component over the full area via the adhesive. Thus, air inclusions between the components are avoided. Moreover, the overall quality of the surface is increased.

In accordance with embodiments, foams may be used as adhesives, such as, for example, PU foam or two-component foam, or indeed other materials suitable for adhesive bonding, e.g. assembly adhesive systems based on PU or acrylate, two-component adhesives, dispersion adhesives, contact adhesives but also double-sided adhesive foam tapes or adhesive foam tapes, may be used. Double-sided adhesive foam tapes or adhesive foam tapes may be applied over a large area, particularly to substantially planar surfaces. Double-sided adhesive foam tapes or adhesive foam tapes may not, however, be applied over the full area. These adhesive tapes are suitable, particularly by virtue of the flexible foam surface, for compensating differences in thickness and/or for permitting longitudinal movement between the composite component and the film.

In accordance with embodiments, the load-bearing composite component may be formed by pressing or extruding. For example, pressing may take place under high pressure at a temperature range of between 240 to 300 degrees Celsius.

In accordance with embodiments, the load-bearing composite component is preferably produced by pressing organo-sheets reinforced with continuous fibres, i.e., fibres having a thermoplastic matrix, into the desired shape under the action of heat. By using continuous fibres, lower thermal expansion of the component is achieved. The use of a thermoplastic ensures good recyclability.

In accordance with embodiments, the load-bearing composite component may also be produced from continuous fibres and a thermosetting plastic, in which case there is generally no recyclability.

In accordance with embodiments, both the load-bearing composite component and the film may be produced from a thermoplastic.

In accordance with embodiments, the adhesive may be applied having a thickness sufficient to ensure accommodation of component tolerances.

In accordance with embodiments, leads or cables may be integrated into the load-bearing composite component and/or the adhesive.

In accordance with embodiments, sensors and/or lighting systems may be integrated into the adhesive.

In accordance with embodiments, at least one aperture, in particular for a lighting system, may be formed in the load-bearing composite component.

In accordance with embodiments, the film may be made transparent at least in some region or regions, in particular in regions with a lighting system situated thereunder. The film may also have imprints or colouring in all regions or in some region or regions on the inside and/or the outside.

In accordance with embodiments, a panelling component for a motor vehicle may be produced by one of the methods described herein, and thus, may encompass all the features described herein.

In accordance with embodiments, a panelling component for a motor vehicle may comprise a press-formed, fibre-reinforced, load-bearing composite component as a first layer, a pre-formed film as a second layer having a class-A surface, and an adhesive applied as a third layer between the load-bearing composite component and the film.

DRAWINGS

Embodiments will be illustrated by way of example in the drawings and explained in the description below.

FIGS. 2a to 2c illustrate side views of a method for producing a panelling component, in accordance with embodiments.

DESCRIPTION

Figure 1:
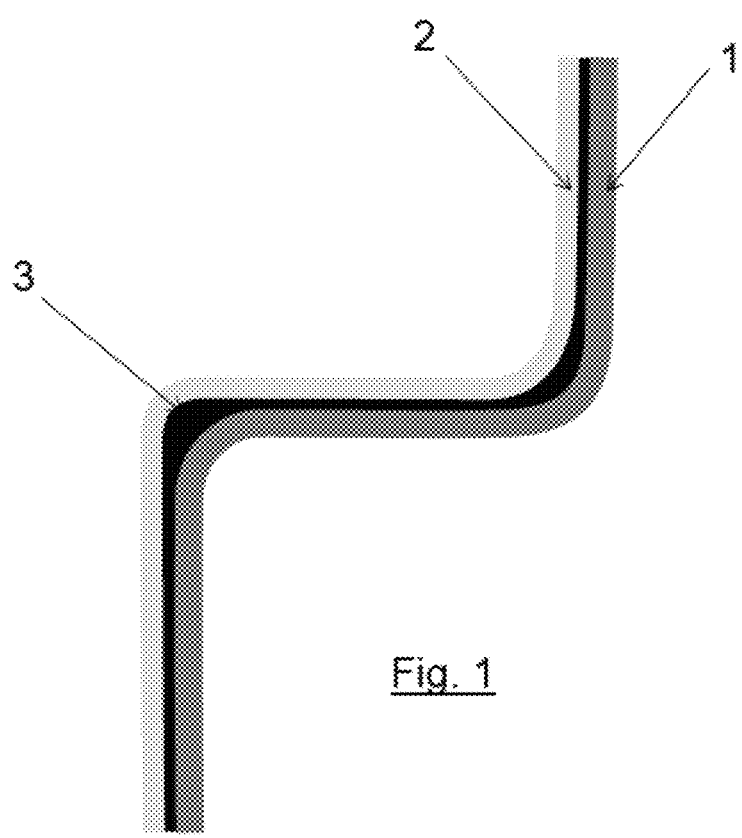
FIG. 1 illustrates a side view of a panelling component, in accordance with embodiments.

In accordance with embodiments, a panelling component for a motor vehicle is illustrated schematically in FIG. 1, and comprises a press-formed, fibre-reinforced, load-bearing composite component 1 as a first layer, a pre-formed film 2 as a second layer having a class-A surface, and an adhesive 3 is applied as a third layer arranged between the load-bearing composite component 1 and the film 2.

The load-bearing composite component 1 may be composed of a plastic reinforced with continuous fibres, e.g., "Tepex GF" made by "Bond Laminates." The load-bearing composite component 1 may be a pressed component comprising a thermoplastic and a fibre reinforcement, e.g., short fibres, long fibres and/or randomly oriented fibres. In accordance with embodiments, the load-bearing composite component 1 predominantly determines the properties of the panelling component, such as the thermal expansion, elasticity modulus thereof etc.

The pre-formed film 2 may be a film composed of ABS/PC or PC, e.g. "Senotop" made by "Senoplast." The film 2 may be transparent or printed on one side or both sides. It is thermoformed using a single-sided mould.

The adhesive 3 forms a joint between the composite component 1 and the film 2. The adhesive 3 is used to impart properties, in particular, the shape of the composite component 1, to the film 2. The adhesive 3 may be applied over the full area, thus avoiding air inclusions between the composite component 1 and the film 2. The adhesive 3 may also be used to compensate for tolerances and differences in the radii of the components.

As illustrated in FIGS. 2a to 2c, the manufacturing or process steps of a method for producing a panelling component, in accordance with embodiments.

As illustrated in FIG. 2a, a film 2, to serve as the subsequent surface of the panelling component, is thermoformed on one side in a mould.

As illustrated in FIG. 2b, In parallel therewith, simultaneously or with a time delay, the composite component 1 is pressed in a different mould.

As illustrated in FIG. 2c, on the far left, an adhesive 3 is then applied to the composite component 1, e.g., by spraying. After this, the composite component 1 and the film 2 are pressed together lightly (second image from the left). After this, the joined component is trimmed (third image from the left). The finished panelling component (fourth image from the left) may be removed from the mould after being formed and provided with a class-A surface.

Figure 3:
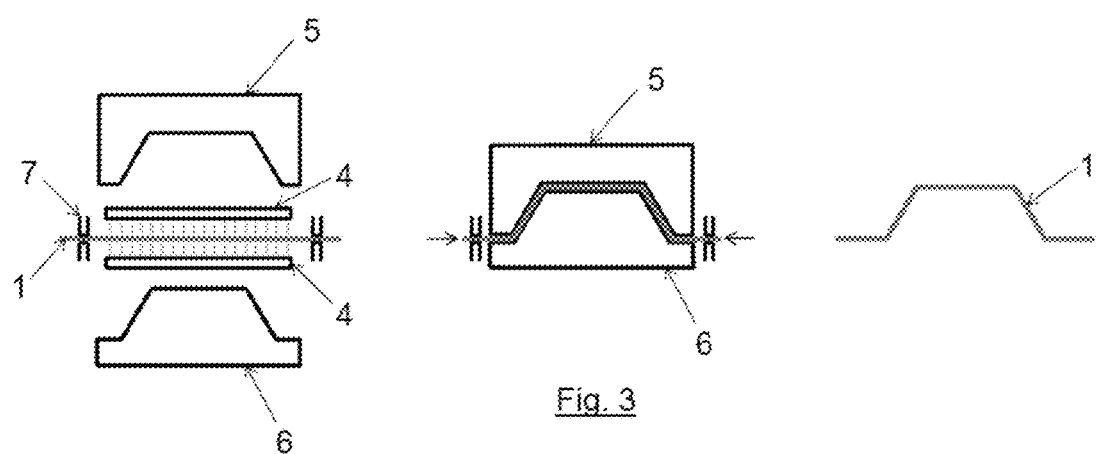
FIG. 3 illustrates illustrate a side view of a method for producing a panelling component, in accordance with embodiments.

As illustrated in FIG. 3, a variant of a method of producing a panelling component, in accordance with embodiments, in which the load-bearing composite component 1 is formed in a thermoforming plant from a material reinforced with continuous fibres and having a thermoplastic matrix.

As illustrated on the extreme left in FIG. 3, the composite component 1 is placed in a thermoforming plant as a semi-finished product, and is heated on both sides by radiant heaters 4. The radiant heaters 4 are arranged between an upper mould half 5 and a lower mould half 6 of the thermoforming plant.

In the central illustration in FIG. 3, the radiant heaters 4 are moved back and the two mould halves 5, 6 are then closed. The hold down device 7 of the mould allows additional material to flow in.

On the extreme right in FIG. 3, a finished composite component 1 suitable for joining to a film 2 may be removed from the mould.

Figure 4:
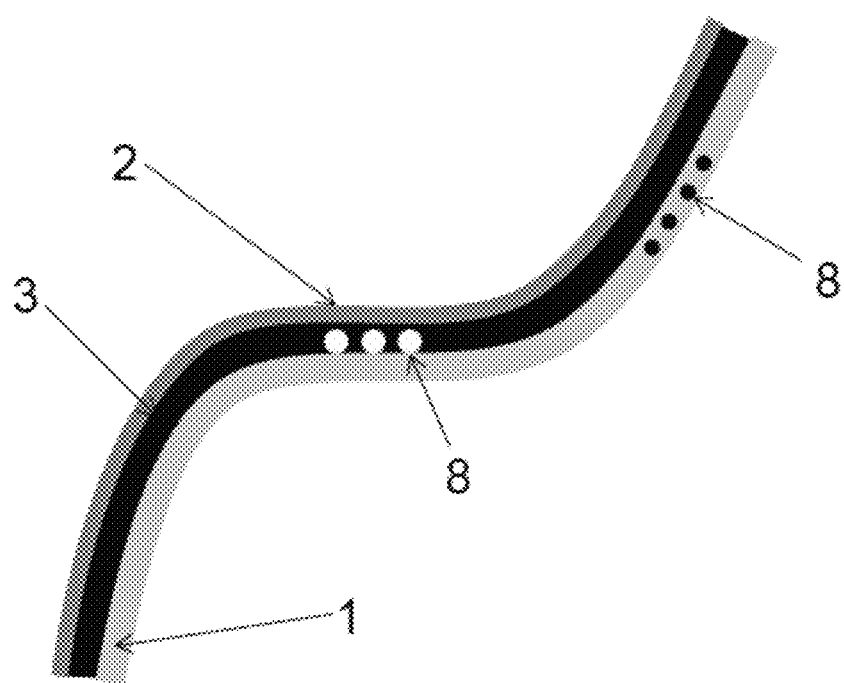
FIG. 4 illustrates a side view of a panelling component, in accordance with embodiments.
Figure 5:
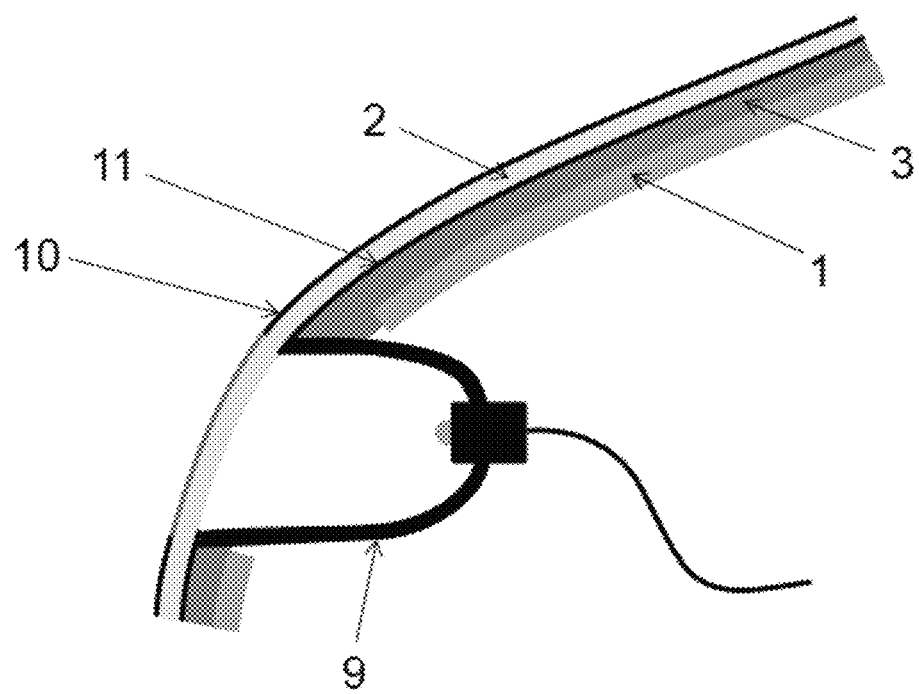
FIG. 5 illustrates a side view of a panelling component, in accordance with embodiments.

FIGS. 4 and 5 illustrate that other functions may also be integrated into a panelling component, in accordance with embodiments.

As illustrated in FIG. 4, a first plurality of electric leads 8 are arranged in the composite component 1, and a second plurality of electric leads 8 are arranged in the adhesive 2.

As illustrated in FIG. 5, the load-bearing composite component 1 and the adhesive 3 have an aperture to receive a lighting system 9, such as, for example, a light cluster. The film 2 may then be of transparent design, at least in a region directly over the lighting system 9. In regions outside the lighting system 9, the film 2 may have an external imprint 10 and/or an internal imprint 11.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 load-bearing composite component
2 film
3 adhesive
4 radiant heater
5 upper mould half
6 lower mould half
7 hold down device
8 electric leads
9 lighting system
10 external imprint
11 internal imprint

What is claimed is:

1. A method for producing a paneling component for a motor vehicle, the method comprising:
   forming a fiber-reinforced load-bearing composite component;
   pressing the load-bearing composite component in a double-sided mould into a first shape;
   forming a film having a class-A surface;
   thermoforming the film, but not the load-bearing composite component, using a single-sided mould while an entire surface of the film is free of direct contact with the single-sided mould so that the film is shaped into a second shape corresponding to the first shape; and
   after the pressing of the load-bearing composite component and the thermoforming of the film, joining the load-bearing composite component, that has the first shape, as a first layer, and the film, that has the second shape, as a second layer via an adhesive as an interposed third layer.

2. The method of claim 1, wherein, before the joining, the film has already set and/or cooled, and/or already has a structure of the paneling component when the paneling component is finished.

3. The method of claim 1, wherein the film comprises a single ply and/or is a co-extrudate.

4. The method of claim 1, wherein the film is connected to the load-bearing composite component over a full surface area thereof via the adhesive.

5. The method of claim 1, wherein the load-bearing composite component is formed by pressing or extruding.

6. The method of claim 1, wherein the load-bearing composite component is produced by pressing organosheets reinforced with continuous fibers into a desired shape under heat.

7. The method of claim 1, wherein the load-bearing composite component and the film are each produced from a thermoplastic.

8. The method of claim 1, wherein the adhesive is applied having a thickness sufficient to ensure accommodation of component tolerances.

9. The method of claim 1, wherein leads or cables are integrated into the load-bearing composite component and/or the adhesive.

10. The method of claim 1,
    wherein sensors and/or lighting systems are integrated into the adhesive.

11. The method of claim 1, further comprising:
    forming at least one aperture in the load-bearing composite component and the adhesive; and
    arranging a lighting system in the at least one aperture.

12. The method of claim 11, wherein a region of the film is at an end of the at least one aperture and is transparent, and an end of the lighting system is arranged directly adjacent to the region so that the end of the lighting system faces the region.

13. The method of claim 1, wherein the entire surface of the film that is free of direct contact with the single-sided mould is the class-A surface.

14. The method of claim 1, wherein the pressing occurs at a temperature range of between 240 to 300 degrees Celsius, and the thermoforming occurs at a temperature range of between 175 to 190 degrees Celsius.

15. A method for producing a paneling component for a motor vehicle, the method comprising:
    forming a fiber-reinforced load-bearing composite component;
    pressing the load-bearing composite component in a double-sided mould into a first shape;
    forming a film having a class-A surface;
    thermoforming the film, but not the load-bearing composite component, in a single-sided mould so that the film is shaped into a second shape corresponding to the first shape;
    after the pressing of the load-bearing composite component and the thermoforming of the film, joining the load-bearing composite component as a first layer, and the film as a second layer via an adhesive as an interposed third layer; and
    before the joining, the film already has a finished shape corresponding to a shape of the paneling component when the paneling component is finished.

* * * * *